United States Patent
Bird et al.

(10) Patent No.: US 8,230,393 B2
(45) Date of Patent: Jul. 24, 2012

(54) TEMPLATE MODEL FOR METADATA CAPTURE

(75) Inventors: Colin L. Bird, Eastleigh (GB); Kamorudeen Larry Yusuf, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 1011 days.

(21) Appl. No.: 12/190,665

(22) Filed: Aug. 13, 2008

(65) Prior Publication Data

US 2010/0042978 A1 Feb. 18, 2010

(51) Int. Cl.
  G06F 9/44 (2006.01)
(52) U.S. Cl. ........ 717/120; 717/104; 717/106; 717/108; 717/124
(58) Field of Classification Search .................. None
  See application file for complete search history.

(56) References Cited

U.S. PATENT DOCUMENTS

| | | | |
|---|---|---|---|
| 6,223,343 B1* | 4/2001 | Hopwood et al. | 717/101 |
| 7,287,037 B2* | 10/2007 | An et al. | 1/1 |
| 7,721,259 B2* | 5/2010 | Heinke et al. | 717/121 |
| 7,882,489 B2* | 2/2011 | Chandrasekharan et al. | 717/106 |
| 8,032,863 B2* | 10/2011 | Kolawa et al. | 717/124 |
| 2006/0123389 A1* | 6/2006 | Kolawa et al. | 717/101 |
| 2006/0143220 A1* | 6/2006 | Spencer | 707/102 |
| 2007/0150855 A1* | 6/2007 | Jeong | 717/106 |
| 2007/0168934 A1* | 7/2007 | Chandrasekharan et al. | 717/106 |
| 2007/0168962 A1* | 7/2007 | Heinke et al. | 717/120 |
| 2007/0203912 A1 | 8/2007 | Thuve et al. | |
| 2008/0059950 A1* | 3/2008 | Seitz et al. | 717/108 |
| 2008/0127047 A1* | 5/2008 | Zhang et al. | 717/104 |
| 2008/0163171 A1* | 7/2008 | Chess et al. | 717/120 |
| 2009/0249295 A1* | 10/2009 | Poole | 717/120 |
| 2010/0095270 A1* | 4/2010 | Seitz et al. | 717/108 |

OTHER PUBLICATIONS

Kris Cardinaels, A Dynamic Learning Object Life Cycle and its Implications for Automatic Metadata Generation, Jun. 9, 2007, ISBN: 978-90-5682-805-9, K.U.Leuven, Belgium, 183 pages, <https://lirias.kuleuven.be/bitstream/1979/882/2/KrisCardinaelsBoek.pdf>.*
Metadata Working Group, Metadata Background Paper, Sep. 2001, CurtinLink Reference Group, pp. 1-10, <http://web.curtin.edu.au/local/docs/Metadata_Background_Paper03.pdf>.*
Lynda Wayne, Metadata in Action, Jun. 2005, GISPlanet 2005, pp. 1-6, <http://gep.frec.vt.edu/pdfFiles/Metadata_PDF's/2.2MetadataInAction.pdf>.*

(Continued)

*Primary Examiner* — Thuy Dao
*Assistant Examiner* — Cuong V Luu
(74) *Attorney, Agent, or Firm* — Yudell Isidore Ng Russell PLLC

(57) ABSTRACT

The illustrative embodiments provide a method, system and computer program product for automatically capturing metadata using a template model. The template model is assembled for automatically capturing metadata during one or more stages of the life cycle of an application. Included in the template model are a description and a source of the metadata during a particular stage of the application lifecycle. The template model further includes multiple fields for dynamically capturing metadata. The template model fields may include: a stage field, an item field, a type field, specific source field, indicative field, a source list field, an analyzer reference field, default value field, and default reason field. A unique label associated with the stage field, of the template model, is read to identify the current stage of the lifecycle. The metadata associated with the current stage is automatically captured, then communicated to the application.

3 Claims, 6 Drawing Sheets

OTHER PUBLICATIONS

Adir Even, The Metadata Enigma, Feb. 2006/vol. 49, No. 2 Communications of the ACM, pp. 88-94, <http://dl.acm.org/citation.cfm?id=1113034.1113035&coll=DL>.*

Weijian Fang, Exposing UDDI Service Descriptions and Their Metadata Annotations as WS-Resources,1-4244-0344-8/06, 2006 IEEE, pp. 128-135, <http://dl.acm.org/citation.cfm?id=1513923.1513954&coll=DL>.*

Radoslav Andreev, Content Metadata Application and Packaging Service (CMAPS) Innovative Framework for Producing SCORM compliant e Learning Content, 0-7695-2338-2/05, 2005 IEEE, 5 pages, <http://ieeexplore.ieee.org/stamp/stamp.jsp?tp=&arnumber=1508673>.*

Loughran, et al., Mining Aspects, Computing Department, Lancaster University, Lancaster UK, 2002.

Greenfield et al, Moving to Software Factories, http://msdn.microsoft.com/vstudio/teamsystem, Microsoft, Corp., Sep. 20, 2004. http://blogs.msdn.com/b/askburton/archive/2004/09/20/232021.aspx.

* cited by examiner

FIG. 4

Table 420

| Lifecycle Event 401 | Metadata 400 (According to Template) |
|---|---|
| Conception 402 | `<stage id="article conception">`      403<br>   `<item label="startDate"`<br>      , description="begin planning the article"<br>      , scope="distinct from any other work on Product X"<br>      ⋮ |
| Research 404 | `<stage id="article research">`      405<br>   `<item label="announceText"`<br>      , description="snippet from product announcement"/><br>   `<type>CDATA</type>`<br>   `<specific>`<br>      `<source>`http://int.mag.org/ProductX/announce/items`</source>`<br>      ⋮ |
| Modeling 406 | `<stage id="article plan">`      407<br>   `<item label="storyboard"`<br>      , description="plan for article text and pictures"<br>      / ><br>   `<type>URI</type>`<br>      ⋮ |
| Creation 408 | `<stage id="article plan">`      409<br>   `<item label="pictures"`<br>      , description=" reference to launch event pictures "<br>      / ><br>   `<type>URI</type>`<br>   `<indicative>`<br>      `<source>`http://int.mag.org/ProductX/launch/items`</source>`<br>      `<analyzer service="findImage"`<br>        , arg="ProductX"<br>      / > `<default value="null"`<br>      reason="No photo found"<br>      ⋮ |
| Maintenance 410 | `<stage id="article archive">`      411<br>   `<item label="shelfLife"`<br>      , description="date when article no longer current", scope="distinct from any other work ...<br>      ⋮ |

TEMPLATE MODEL FOR METADATA CAPTURE

BACKGROUND

1. Technical Field

The present invention generally relates to computer systems and in particular to content management in computer memory systems.

2. Description of the Related Art

Software solutions deliver business information processing by integrating a set of well-defined components or services. Efficient engineering of such solutions depends on definition and reuse of components whose functional lifecycle, and non-functional characteristics can be specified. Metadata is crucial to the discovery and reuse of services. Service discovery and reuse depends on phase of the project, and levels of certification. Example phases include: prototype, in development, test, pre production, production (with or without certain quality-of-service policies attached).

To ensure business integrity as well as information technology (IT) integrity of the solution, the right services and components should be deployed, accessed, and utilized. Governance bodies within an organization may define standards for certifying a service for utilization or archiving. Standards like information technology infrastructure library (ITIL) encourage the provision of a definitive source library to ensure that the certified services are retrieved from one repository.

While these useful practices exist, more is needed to guarantee the right service and/or information is being accessed, and furthermore, enable dynamic selection of the service and/or information. To certify a service, metadata that may not be captured easily (utilizing manual mechanisms) is needed. Currently, metadata searches are completed manually, and the search is completed primarily based on fields defining a service name, type, and content.

SUMMARY OF ILLUSTRATIVE EMBODIMENTS

Disclosed are a method, system and computer program product for automatically capturing metadata using a template model. The template model is assembled for automatically capturing metadata during one or more stages of the life cycle of an application. Included in the template model are a description and a source of the metadata during a particular stage of the application lifecycle. The template model further includes multiple fields for dynamically capturing metadata. The template model fields may include: a stage field, an item field, a type field, specific source field, indicative field, a source list field, an analyzer reference field, default value field, and default reason field. A unique label associated with the stage field, of the template model, is read to identify the current stage of the lifecycle. The metadata associated with the current stage is automatically captured, then communicated to the application.

The above as well as additional features of the present invention will become apparent in the following detailed written description.

BRIEF DESCRIPTION OF THE DRAWINGS

The invention itself will best be understood by reference to the following detailed description of an illustrative embodiment when read in conjunction with the accompanying drawings, wherein:

FIG. 4 is a logic flow chart of the process of capturing metadata associated with an application in accordance with one embodiment of the invention;

DETAILED DESCRIPTION OF AN ILLUSTRATIVE EMBODIMENT

Figure 1:
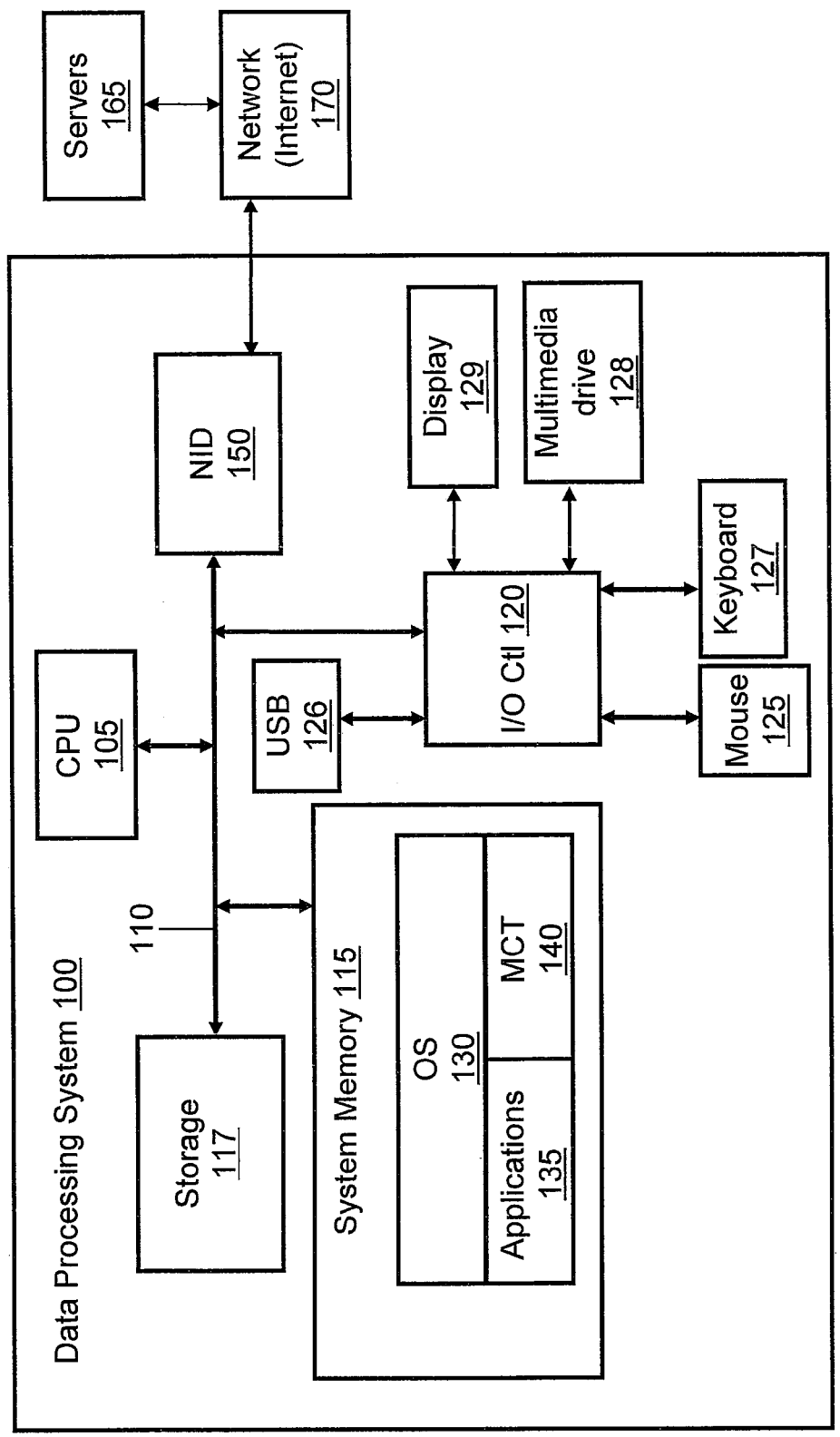
FIG. 1 is a block diagram of a data processing system according to one embodiment of the invention.
Figure 2:
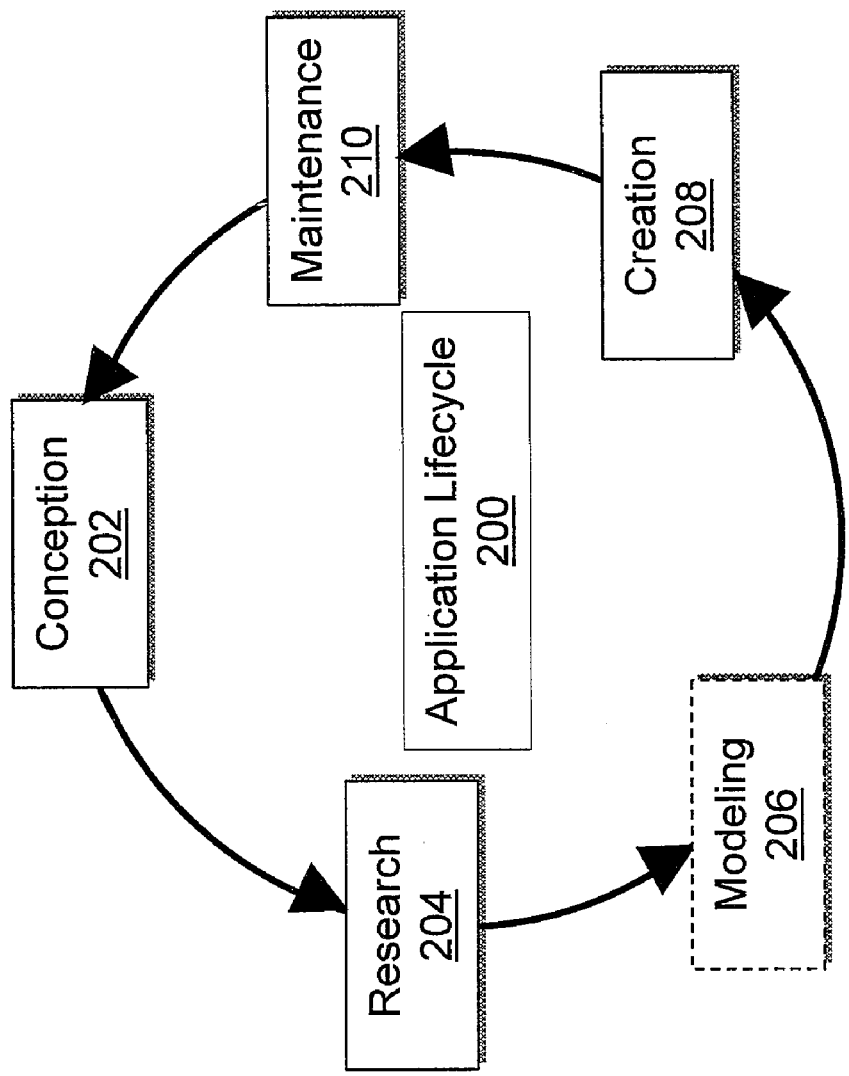
FIG. 2 is a diagram illustrating the lifecycle events of an application in accordance with one embodiment of the invention.

The illustrative embodiments provide a method, system and computer program product for automatically capturing metadata using a template model. The template model is assembled for automatically capturing metadata during one or more stages of the life cycle of an application. Included in the template model are a description and a source of the metadata during a particular stage of the application lifecycle. The template model further includes multiple fields for dynamically capturing metadata. The template model fields may include: a stage field, an item field, a type field, specific source field, indicative field, a source list field, an analyzer reference field, default value field, and default reason field. A unique label associated with the stage field, of the template model, is read to identify the current stage of the lifecycle. The metadata associated with the current stage is automatically captured, then communicated to the application.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Within the descriptions of the figures, similar elements are provided similar names and reference numerals as those of the previous figure(s). The specific numerals assigned to the elements are provided solely to aid in the description and not meant to imply any limitations (structural or functional) on the invention.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that terms is utilized. Herein the terms "metadata life cycle stage" may be described as "life cycle stage"; however, each description refers to one or more metadata life cycle stages.

With reference now to the figures, FIG. 1 depicts a block diagram representation of a data processing system (DPS) (and connected network). DPS 100 comprises at least one processor or central processing unit (CPU) 105 connected to system memory 115 via system interconnect/bus 110. Also connected to system bus 110 is input/output (I/O) controller 120, which provides connectivity and control for input devices, of which pointing device (or mouse) 125 and keyboard 127 are illustrated, and output devices, of which display 129 is illustrated. Additionally, a multimedia drive 128 (e.g., CDRW or DVD drive) and USB (universal serial bus) port 126 are illustrated, coupled to I/O controller. Multimedia drive 128 and USB port 126 may operate as both input and output (storage) mechanisms. DPS 100 also comprises storage 117, within which data/instructions/code may be stored.

DPS 100 is also illustrated with a network interface device (NID) 170, with which DPS 100 connects to one or more servers 165 via an access network such as the Internet 170. In the described embodiments, Internet 170 is a worldwide collection of networks and gateways that utilize the Transmission Control Protocol/Internet Protocol (TCP/IP) suite of protocols to communicate with one another. Of course, network access may also be provided via a number of different types of networks, such as an intranet, a local area network (LAN), a virtual private network (VPN), or other wide area network (WAN) other than the Internet, for example.

Notably, in addition to the above described hardware components of DPS 100, various features of the invention are completed via software (or firmware) code or logic stored within system memory 115 or other storage (e.g., storage 117) and executed by CPU 110. Thus, illustrated within system memory 115 are a number of software/firmware components, including operating system (OS) 130 (e.g., Microsoft Windows®, a trademark of Microsoft Corp, GNU®/Linux®, registered trademarks of the Free Software Foundation and Linus Torvalds, or AIX®, a registered trademark of IBM), applications 135, and metadata capture template (MCT) utility 140. In actual implementation, applications 135 and MCT utility 140 may be combined as a single application collectively providing the various functions of each individual software component when the corresponding code is executed by the CPU 110. For simplicity, MCT utility 140 is illustrated and described as a stand alone or separate software/firmware component, which provides specific functions, as described below.

CPU 105 executes MCT utility 140 as well as OS 130, which supports the user interface features of MCT utility 140. In the illustrative embodiment, MCT utility 140 provides a template model to enable manipulation of the functional features of the utility (140). Among the software code/instructions provided by MCT utility 140, and which are specific to the invention, are: (a) code for automatically capturing metadata using a template model; (b) code for assembling the template model for automatically capturing metadata during one or more stages of a lifecycle of an application; (c) code for automatically capturing metadata associated with a stage of the life cycle of the application; and (d) code for communicating the captured (or collected) metadata to the application. For simplicity of the description, the collective body of code that enables these various features is referred to herein as MCT utility 140. According to the illustrative embodiment, when CPU 105 executes MCT utility 140, DPS 100 initiates a series of functional processes that enable the above functional features as well as additional features/functionality, which are described below within the description of FIGS. 2-5.

Those of ordinary skill in the art will appreciate that the hardware and basic configuration depicted in FIG. 1 may vary. For example, other devices/components may be used in addition to or in place of the hardware depicted. The depicted example is not meant to imply architectural limitations with respect to the present invention. The data processing system depicted in FIG. 1 may be, for example, an IBM eServer pSeries system, a product of International Business Machines Corporation in Armonk, N.Y., running the Advanced Interactive Executive (AIX) operating system or LINUX operating system. The processor components that enable the different aspects of the invention may generally be referred to as logic or logic components With reference now to FIG. 2, which illustrates the stages within the lifecycle of an application. Application lifecycle 200 may include the stages of conception stage 202, research stage 204, modeling stage 206, creation stage 208, and maintenance stage 210.

In one embodiment, the lifecycle of a substantial piece of data passes through five stages. The five stages that data may pass through are conception stage 202, research stage 204, modeling stage 206, creation stage 208, and maintenance stage 210. The stage of modeling 206 is encountered when modeling is available. At each stage the environment contains a mixture of specific values and clues that can be exploited to populate the metadata that is known to be required for an application. The template model makes explicit the specific values that are to be captured and the clues that are to be analyzed. A stage of application lifecycle 200 is identified by MCT utility 140 (FIG. 1). The metadata associated with the current stage is automatically captured and communicated to the application.

In one embodiment, metadata is needed for the discovery and reuse of services. Stages of application lifecycle 200 are utilized to ensure the right services, or information, is being accessed. The stages of application lifecycle 200 define the stages in which metadata is captured in an application. Conception stage 202 is a stage where the need for a particular service, or metadata search, is evident. At research stage 204 a search is conducted for components and existing interfaces (e.g. text and photos) that may support the development and provision of a service.

Modeling stage 206 is utilized to design how an application will use a service to capture inputs, capture outputs, determine the quality of services, and the quality of phases. Example phases are prototype, in development, test, preproduction, and production. Metadata is captured for developed services in creation stage 208. In creation stage 208 an analysis is performed for costs and quality of service (QoS) policies. In maintenance stage 210, the amount of usage of the service is determined, and the maintenance required for maintaining the service or archiving the service is also determined.

Figure 3:
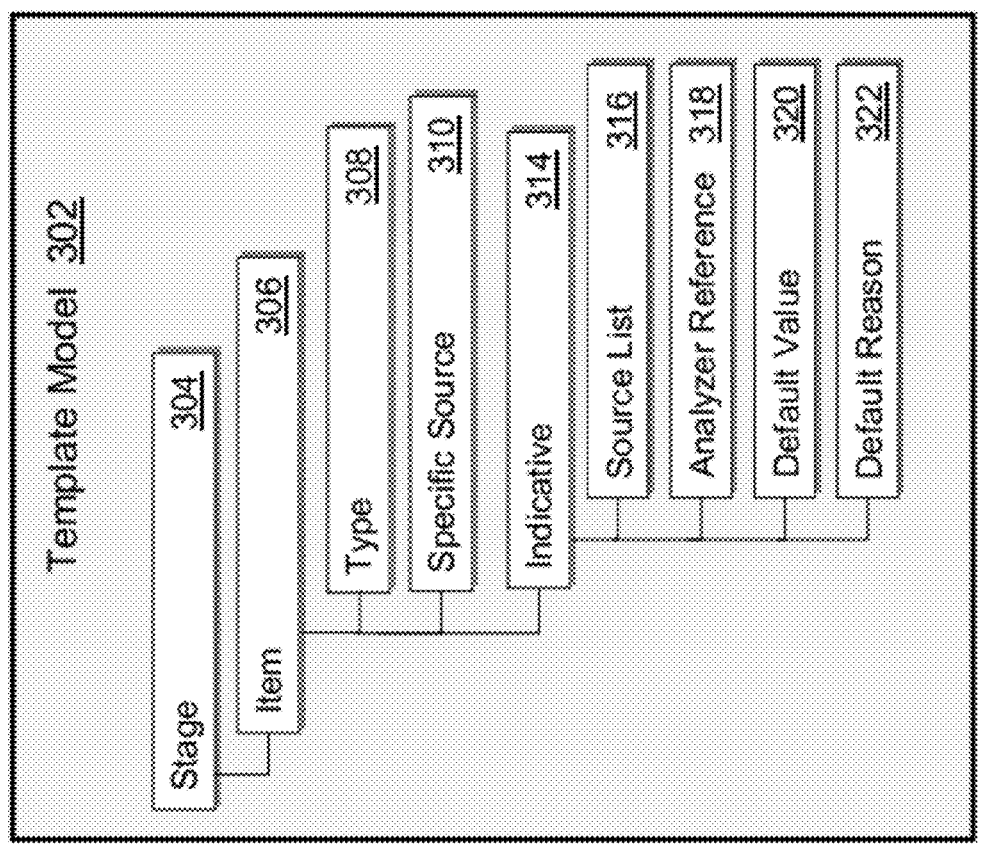
FIG. 3 is a diagram illustrating a template model for automatically capturing metadata according to one embodiment of the invention.

FIG. 3 depicts fields of a template model utilized to dynamically capture metadata. Template model 302 of FIG. 3 comprises stage field 304, item field 306, type field 308, specific source field 310, and indicative field 314. In addition to indicative field 314, template model 302 also includes source list 316, analyzer reference 318, default value 320, and default reason 322.

In one embodiment, MCT utility 140 (FIG. 1) reads the metadata of template model 302 that is associated with the current lifecycle stage. The metadata of template model 302 is identified by a unique label associated with the current stage of the lifecycle, the unique label may be titled the stage identification (ID).

In one embodiment, template model 302 includes a description and a source of the metadata at each stage of a lifecycle. Template model 302 further includes stage field 304 for indicating the particular stage of the lifecycle, item field 306 for describing the metadata pertaining to the particular stage, type field 308 for identifying the data type of the metadata, specific source field 310 for directly identifying a specific source of the metadata. Indicative field 314 is utilized for analyzing one or more source clues for indirectly capturing the metadata, source list field 316 for identifying the source of one or more source clues. Typically, each item utilizes an indicative source (indicative field 314) or a specific source (specific source field 310), minimal occasions utilize both an indicative source and specific source.

Additionally, analyzer reference field 318 indicates a path to an executable fragment for deriving a metadata value when used in conjunction with one or more source clues. Default value field 320 is utilized for recording a default metadata value when an inability to derive the metadata value is present. Default reason field 322 records the cause for the inability to derive the metadata value.

In one embodiment, although the acquisitions for each field are intended to be automatic, the overall capture process may be regarded as 'supervised automatic'. A user retains the option to check values acquired by template model 302 and make any appropriate adjustments. The overall intention, however, is to minimize manual intervention.

Depicted in FIG. 4 is a table that displays metadata collected at various stages of an application lifecycle. Table 420 comprises metadata column 400 and lifecycle event column 401. Metadata 400 includes conception metadata 403, research metadata 405, modeling metadata 407, creation metadata 409, and maintenance metadata 411. Lifecycle event column 401 of table 420 includes conception stage 402, research stage 404, modeling stage 406, creation stage 408, and maintenance stage 410.

In one embodiment, metadata column 400 displays metadata collected at each stage of the lifecycle of an application. The number of items within metadata column 400 has been drastically reduced to provide a basic illustration of the options available for capturing the metadata. In practice, an application would capture much more metadata than described in metadata column 400. Metadata associated with the current stage of the application's lifecycle is captured according to the template model (depicted in FIG. 3). Each field of a template model may be represented during capture of metadata; however, only fields necessary for the current lifecycle stage may capture metadata.

In one embodiment, a template model is utilized to automatically collect metadata. A fragment of the collected data is depicted in metadata column 400. During conception stage 402, the template model is utilized to collect data pertaining to planning by defining the expected behavior and usage patterns of the application, in conception metadata 403. Components and existing interfaces are searched that may support the development and provision of the service, the metadata is collected in research metadata 405. Modeling metadata 407 collects metadata associated with the overall design of the service, such as capturing inputs, outputs, the quality of service of the application, and phases related to the application. Metadata is captured for developed services and an analysis of owning organizations, costs, and quality of service policies in creation metadata 408. In maintenance metadata 411 the amount of usage for the service is determined as well requirements for maintaining the service, or archiving the service.

Figure 5:
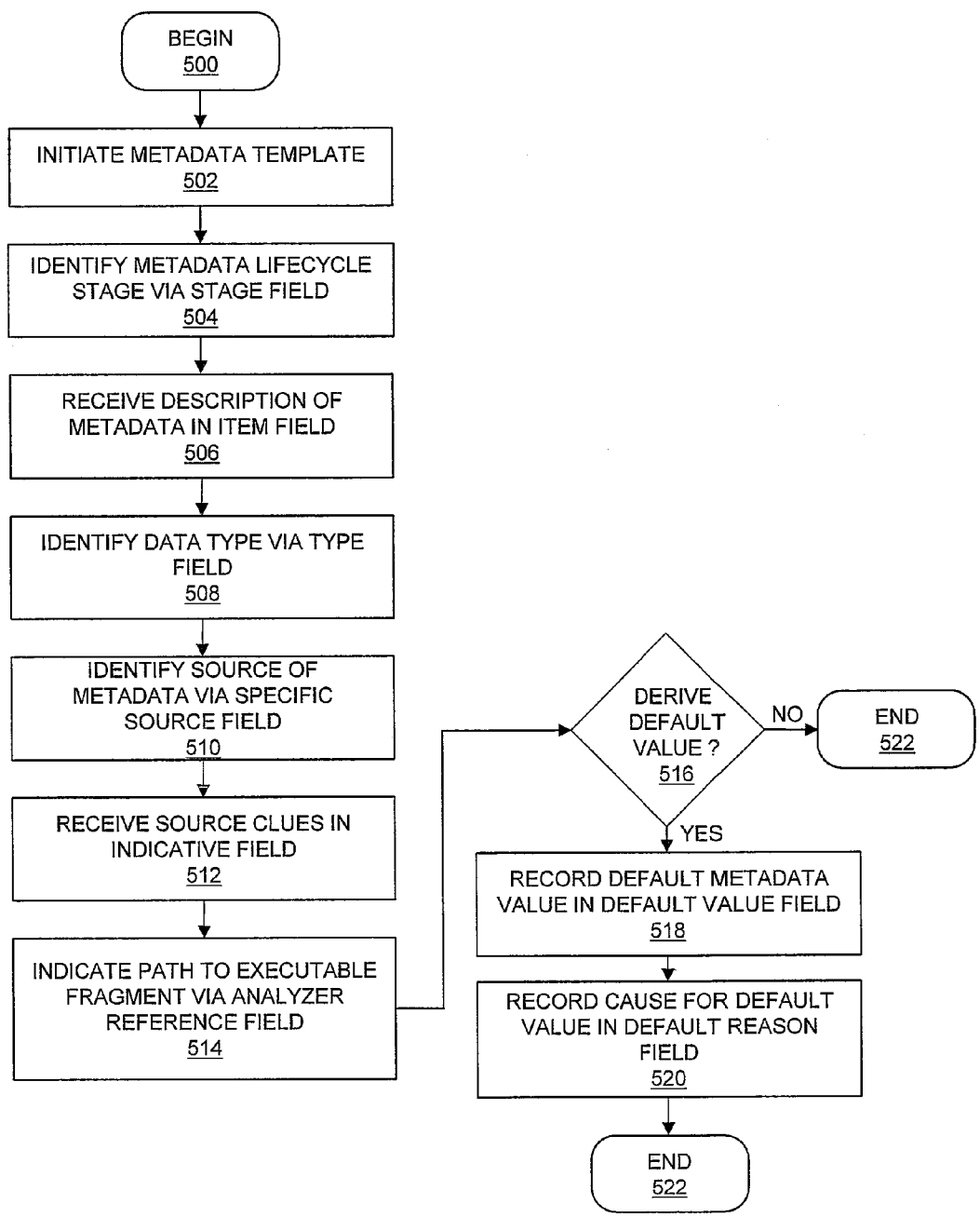
FIG. 5 is a logic flow chart of the process for communicating metadata to an application according to one embodiment of the invention.
Figure 6:
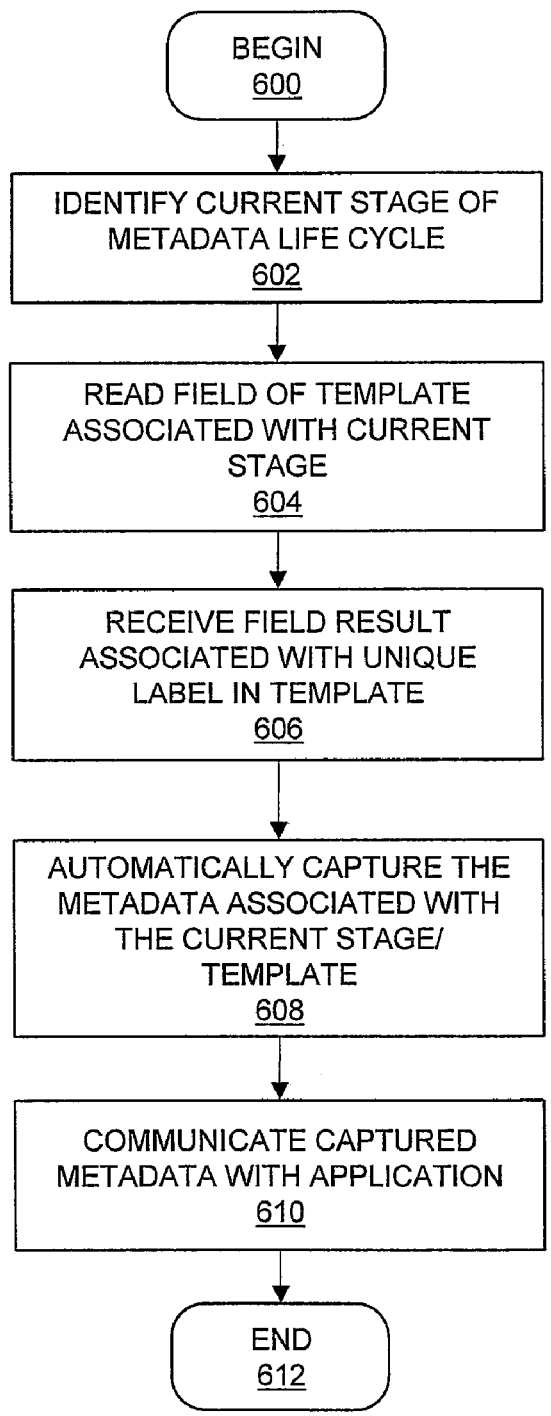
FIG. 6 is a logic flow chart of the process for communicating metadata to an application according to one embodiment.

FIGS. 5-6 are flow charts illustrating various methods by which the above processes of the illustrative embodiments are completed. Although the methods illustrated in FIGS. 5-6 may be described with reference to components shown in FIGS. 1-4, it should be understood that this is merely for convenience and alternative components and/or configurations thereof can be employed when implementing the various methods. Key portions of the methods may be completed by MCT utility 140 executing within DPS 100 (FIG. 1) and controlling specific operations on DPS 100, and the methods are thus described from the perspective of both MCT utility 140 and DPS 100.

FIG. 5 depicts a process for capturing metadata associated with an application. The process of FIG. 5 begins at initiator block 500 and proceeds to block 502, at which a metadata template model is initiated. At block 504, the metadata lifecycle stage is identified via the stage field. A description of the metadata is received in the item field, at block 506. The data type to be collected is identified, at block 508, via the type field. At block 510 the resource for the information is identified via the specific source field. In the indicative field source clues are received at block 512. A path is indicated at block 514, wherein the path references the executable fragment via the analyzer reference field. At block 516 a decision is made whether to derive a metadata default value. If the default value is derived, the process continues to block 518. If the default value is not derived the process ends at block 522. At block 518 the default metadata value is recorded in the default value field. A cause for recording the default value is recorded in the default reason field at block 520. The process ends at block 522.

The process of communicating collected metadata to an associated application is described in FIG. 6. The process begins at block 600 and proceeds to block 602 where the current stage of the metadata lifecycle is identified. When the section of the template model associated with the current life cycle stage is read, the metadata associated with a unique label in the template is received. The section of the template model is identified by the unique label associated with the current life cycle stage.

At block 604 each field of the template model, associated with the current lifecycle stage, is read. The template field result that is associated with the unique label in the template is received at block 606. At block 608, the metadata associated with the current life cycle stage and template is automatically captured. The captured metadata is communicated to the associated application at block 610. The process ends at block 612.

In the flow charts above, one or more of the methods are embodied as a computer program product in a computer readable medium or containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture (or computer program product) in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a computer program product in a variety of forms, and that an illustrative embodiment of the present invention applies equally regardless of the particular type of media used to actually carry out the distribution. By way of example, a non exclusive list of types of media, includes recordable type (tangible) media such as floppy disks, thumb drives, hard disk drives, CD ROMs, DVDs, and transmission type media such as digital and analogue communication links.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method executed by a hardware data processor for automatically capturing metadata using a template model, the method comprising:
   assembling a template model for automatically capturing metadata during one or more stages of a lifecycle of an application, wherein said template model includes a description and a source of said metadata at a particular stage of said lifecycle;
   wherein said template model further includes a stage field for indicating said particular stage of said lifecycle, an item field for describing said metadata pertaining to said particular stage, a type field for identifying a datatype of said metadata, a specific source field for directly identifying a specific source of said metadata, an indicative field for analyzing one or more source clues for indirectly capturing said metadata, a source list field for identifying a source of said one or more source clues, an analyzer reference field for indicating a path to an executable fragment for deriving a metadata value when used in conjunction with said one or more source clues, a default value field for recording a default metadata value when an ability is not present to derive said metadata value is present, and a default reason field for recording a cause for said inability to derive said metadata value;
   identifying a current stage of said life cycle from among conception stage, research stage, modeling stage, creation stage, and maintenance stage;
   the hardware data processor reading a section of said template model associated with said current stage to receive said metadata associated with a unique label in said template, wherein said section of said template model is identified by said unique label associated with said current stage, wherein each stage contains a mixture of specific values and clues that can be exploited to populate the metadata that is known to be required for an application, and the template model makes explicit the specific values that are to be captured and the clues that are to be analyzed;
   automatically capturing said metadata associated with said current stage; and
   communicating said captured metadata to said application.

2. In a hardware data processor, a system for automatically capturing metadata using a template model, the system comprising:
   a data processor; and
   logic that executes on the data processor for assembling a template model for automatically capturing metadata during one or more stages of a lifecycle of an application, wherein said template model includes a description and a source of said metadata at a particular stage of said lifecycle;
   wherein logic for said template model further contains logic for indicating said particular stage of said lifecycle in a stage field, logic for describing said metadata pertaining to said particular stage in an item field, logic for identifying a datatype of said metadata in a type field, logic for directly identifying a specific source of said metadata in a specific source field, logic for analyzing one or more source clues for indirectly capturing said metadata in an indicative field, logic for identifying a source of said one or more source clues in a source list field, logic for indicating a path to an executable fragment for deriving a metadata value when used in conjunction with said one or more source clues in an analyzer reference field, logic for recording a default metadata value when an ability is not present to derive said metadata value is present in a default value field, and logic for recording a cause for said inability to derive said metadata value in a default reason field;
   logic for identifying a current stage of said lifecycle from among conception stage, research stage, modeling stage, creation stage, and maintenance stage;
   logic for reading a section of said template model associated with said current stage to receive metadata associated with a unique label in said template, wherein said section of said template model is identified by said unique label associated with said current stage, wherein each stage contains a mixture of specific values and clues that can be exploited to populate the metadata that is known to be required for an application, and the template model makes explicit the specific values that are to be captured and the clues that are to be analyzed;
   logic for automatically capturing said metadata associated with said current stage; and
   logic for communicating said captured metadata to said application.

3. A data processing system comprising a processor and program code executing on the processor configured for automatically capturing metadata using a template model, said program code comprising code that executes on the processor to cause the data processing system to:

assemble a template model for automatically capturing metadata during one or more stages of a lifecycle of an application, wherein said template model includes a description and a source of said metadata at a particular stage of said lifecycle;

wherein said template model further contains code for indicating said particular stage of said lifecycle in a stage field, code for describing said metadata pertaining to said particular stage in an item field, code for identifying a datatype of said metadata in a type field, code for directly identifying a specific source of said metadata in a specific source field, code for analyzing one or more source clues for indirectly capturing said metadata in an indicative field, code for identifying a source of said one or more source clues in a source list field, code for indicating a path to an executable fragment for deriving a metadata value when used in conjunction with said one or more source clues in an analyzer reference field, code for recording a default metadata value when an ability is not present to derive said metadata value is present in a default value field, and code for recording a cause for said inability to derive said metadata value in a default reason field;

identify a current stage of said lifecycle from among conception stage, research stage, modeling stage, creation stage, and maintenance stage;

read a section of said template model associated with said current stage to receive metadata associated with a unique label in said template, wherein said section of said template model is identified by said unique label associated with said current stage, wherein each stage contains a mixture of specific values and clues that can be exploited to populate the metadata that is known to be required for an application, and the template model makes explicit the specific values that are to be captured and the clues that are to be analyzed;

automatically capturing said metadata associated with said current stage; and communicating said captured metadata to said application.

* * * * *